United States Patent
Su

(10) Patent No.: US 11,090,746 B2
(45) Date of Patent: Aug. 17, 2021

(54) ROTARY CUTTER FOR CUTTING DAMAGED THREADS OF A BOLT

(71) Applicant: Hong Ann Tool Industries Co., Ltd., Taichung (TW)

(72) Inventor: Cheng-Wei Su, Taichung (TW)

(73) Assignee: Hong Ann Tool Industries Co., Ltd., Taichung (TW)

( * ) Notice: Subject to any disclaimer, the term of this patent is extended or adjusted under 35 U.S.C. 154(b) by 205 days.

(21) Appl. No.: 16/392,725

(22) Filed: Apr. 24, 2019

(65) Prior Publication Data

US 2020/0338656 A1    Oct. 29, 2020

(51) Int. Cl.
*B23G 9/00* (2006.01)
*B23B 5/16* (2006.01)
*B23B 51/10* (2006.01)

(52) U.S. Cl.
CPC .............. *B23G 9/009* (2013.01); *B23B 5/167* (2013.01); *B23B 51/103* (2013.01); *B23B 2220/08* (2013.01); *Y10T 408/89* (2015.01); *Y10T 408/899* (2015.01)

(58) Field of Classification Search
CPC ..... B23B 5/167; B23B 51/101; B23B 51/103; B23B 2220/08; B23G 9/003; B23G 9/009; Y10T 408/89; Y10T 408/899
See application file for complete search history.

(56) References Cited

U.S. PATENT DOCUMENTS

| | | | | |
|---|---|---|---|---|
| 2,292,581 A | * | 8/1942 | Richardson | B23G 9/004 408/211 |
| 3,242,526 A | * | 3/1966 | Wilton | F21V 35/00 408/211 |
| 3,754,832 A | * | 8/1973 | Stickler | B23B 5/167 408/227 |
| 3,875,832 A | * | 4/1975 | Mayfield | B23B 5/162 82/113 |
| 4,205,493 A | * | 6/1980 | Kim | B24D 7/18 408/211 |
| 4,798,109 A | * | 1/1989 | Berns | B23B 5/163 408/80 |

(Continued)

FOREIGN PATENT DOCUMENTS

| | | | | |
|---|---|---|---|---|
| EP | 2532458 A1 | * | 12/2012 | B24B 9/00 |
| FR | 1256805 A | * | 3/1961 | B23B 5/167 |
| TW | I640378 B | | 11/2018 | |

*Primary Examiner* — Eric A. Gates
(74) *Attorney, Agent, or Firm* — Alan D. Kamrath; Karin L. Williams; Mayer & Williams PC

(57) ABSTRACT

A rotary cutter for cutting damaged threads of a bolt includes a body rotatable about a rotating axis. The body includes a connecting end and an operative end. The body includes an inner periphery delimiting a cutting space extending along the rotating axis from the operative end towards but spaced from the connecting end. A width of the cutting space in a diametric direction perpendicular to the rotating axis gradually reduces from the operative end toward the connecting end to form a conic space. The body further includes at least one cutting blade disposed on the inner periphery. The at least one cutting blade includes a first cutting blade section and a second cutting blade section. The first cutting blade section is arcuate or rectilinear. The second cutting blade section is arcuate or rectilinear. The first and second cutting blade sections are not identical.

12 Claims, 10 Drawing Sheets

(56) References Cited

U.S. PATENT DOCUMENTS

| | | | | |
|---|---|---|---|---|
| 4,798,503 A * | 1/1989 | Huju | ............... | B23B 49/04 |
| | | | | 144/219 |
| 9,821,393 B2 * | 11/2017 | Su | ............... | B23B 5/167 |
| 10,293,410 B2 * | 5/2019 | Yu | ............... | B23B 5/167 |
| 10,654,108 B2 * | 5/2020 | Su | ............... | B23B 51/103 |
| 10,766,074 B2 * | 9/2020 | Su | ............... | B23G 9/003 |
| 2016/0082517 A1 * | 3/2016 | Ferguson | ............... | B23B 5/167 |
| | | | | 408/1 BD |

* cited by examiner

ROTARY CUTTER FOR CUTTING DAMAGED THREADS OF A BOLT

BACKGROUND OF THE INVENTION

The present invention relates to a rotary cutter and, more particularly, to a rotary cutter for cutting damaged threads of a bolt.

A bolt is generally used to fasten an object, and a nut is mounted around the bolt. A distal end of the bolt could rust, accumulate dirt, or even deform under impact by an alien object, such that the nut cannot be smoothly threaded onto the bolt. A general approach in this situation is to cut the bolt with a screw die to remove rust, dirt, or the damaged portion from the bolt.

When a bolt encounters the above situation, the nut merely gets stuck on the distal end of the bolt, and the remaining portion of the bolt is still useable. In the approach using the screw die, the screw die must be precisely aligned with the threads of the bolt before cutting, so as to assure the cutting route is identical to the original threads of the bolt, which is time-consuming and has low efficiency.

Taiwan Invention Patent No. I640378 discloses a rotary cutter including a body rotatable about a rotating axis. The body includes a cutting space and a first cutting blade disposed on an inner periphery of the cutting space. The body further includes a virtual projection plane perpendicular to the rotating axis. A first virtual plane passes through the first cutting blade and extends perpendicularly to the virtual projection plane. A virtual circle and a first virtual reference line are located on the virtual projection plane. The first virtual reference line intersects with the rotating axis and passes through an intersection of the first virtual plane and the virtual circle. An angle between the first virtual reference line and the first virtual plane and on the virtual projection plane is between 20° and 40°.

The major advantage of the above rotary cutter is the conical design that permits cutting of various bolts of larger or smaller diameters. The rotary cutter rotates at a constant speed. However, the contact point in the case of cutting a large-diameter bolt is different from the contact point in the case of cutting a small-diameter bolt. Thus, the cutting speed will change when the diameter is changed while the cutting angle of the first cutting blade is fixed. As a result, the cutting result is bad when the cutting position does not match with the cutting angle and the cutting speed.

Thus, a need exists for a novel rotary cutter that mitigates and/or obviates the above disadvantages.

BRIEF SUMMARY OF THE INVENTION

The primary objective of the present invention is to provide a rotary cutter for cutting damaged threads of a bolt. The rotary cutter includes a body rotatable about a rotating axis. The body includes a connecting end and an operative end opposite to the connecting end along the rotating axis. The body includes an inner periphery delimiting a cutting space extending along the rotating axis from the operative end towards but spaced from the connecting end. A width of the cutting space in a diametric direction perpendicular to the rotating axis gradually reduces from the operative end toward the connecting end to form a conic space. The body further includes at least one cutting blade disposed on the inner periphery delimiting the cutting space. The at least one cutting blade includes a first cutting blade section and a second cutting blade section. The first cutting blade section is arcuate or rectilinear. The second cutting blade section is arcuate or rectilinear. The first and second cutting blade sections are not identical. The rotary cutter according to the present invention can cut bolts of different diameters with a corresponding proper cutting angle, achieving an excellent cutting effect.

In an example, the body further includes a virtual projection plane perpendicular to the rotating axis. A first cutting blade section projection is a projection of the first cutting blade section on the virtual projection plane. The first cutting blade section projection includes a first center of circle located on a side of the first cutting blade section projection adjacent to a rear side of the first cutting blade section. The first cutting blade section projection is an arcuate line and is concave towards the first center of circle. A first radius is equal to a spacing between the first center of circle and the first cutting blade section projection and is in a range between 20 cm and 50 cm. A second cutting blade section projection is a projection of the second cutting blade section on the virtual projection plane. The second cutting blade section projection includes a second center of circle located on a side of the second cutting blade section projection adjacent to a front side of the second cutting blade section. The second cutting blade section projection is an arcuate line and is concave towards the second center of circle. A second radius is equal to a spacing between the second center of circle and the second cutting blade section projection and is in a range between 50 cm and 80 cm.

In an example, the first radius is in a range between 25 mm and 35 mm, and the second radius is in a range between 60 mm and 70 mm.

In an example, the second cutting blade section projection is tangent to the first cutting blade section projection.

In another example, the body further includes a virtual projection plane perpendicular to the rotating axis. A first cutting blade section projection is a projection of the first cutting blade section on the virtual projection plane. A second cutting blade section projection is a projection of the second cutting blade section on the virtual projection plane. The first cutting blade section projection is arcuate, and the second cutting blade section projection is rectilinear.

In still another example, the first cutting blade section projection is rectilinear, and the second cutting blade section projection is arcuate.

In yet another example, the first cutting blade section projection is rectilinear, and the second cutting blade section projection is rectilinear.

In an example, the body includes a virtual circle, a first virtual reference line, and a second virtual reference line. The virtual circle has a diameter between 1 mm and 20 mm. An end of the first cutting blade section projection adjacent to the rotating axis is located on the virtual circle. The first virtual reference line intersects with the rotating axis and passes through the end of the first cutting blade section projection. The second virtual reference line intersects with the rotating axis and passes through an end of the second cutting blade section projection distant from the rotating axis. An angle between the first virtual reference line and the second virtual reference line is between 20° and 40°.

In an example, the angle between the first virtual reference line and the second virtual reference line is between 25° and 35°.

In an example, a first virtual tangent plane extends perpendicularly to the rotating axis and is tangent to the first cutting blade section. A spacing between the first cutting blade section and the rotating axis is smaller than a spacing between any point on the inner periphery of the body delimiting the cutting space and the rotating axis. A second virtual tangent plane extends perpendicularly to the rotating axis and is tangent to the second cutting blade section. A spacing between the second cutting blade section and the rotating axis is smaller than the spacing between any point on the inner periphery of the body delimiting the cutting space and the rotating axis.

In an example, the inner periphery of the body delimiting the cutting space includes an evasive portion and a scrap discharge groove in a radial direction perpendicular to the rotating axis. The evasive portion and the scrap discharge groove correspond to the at least one cutting blade. The evasive portion is located on a rear side of the at least one cutting blade and is contiguous to the at least one cutting blade. On the first virtual cutting plane or the second virtual cutting plane, a spacing from the evasive portion to the rotating axis gradually increases from a side of the evasive portion adjacent to the at least one cutting blade towards another side of the evasive portion distant from the at least one cutting blade. The scrap discharge groove is located on a front side of the at least one cutting blade and is contiguous to the at least one cutting blade. An end of the scrap discharge groove intercommunicates with the cutting space. Another end of the scrap discharge groove extends through the body to an outer periphery of the body.

In an example, the at least one cutting blade is integrally formed with the body.

In an example, the at least one cutting blade includes three cutting blades spaced from each other by regular angular intervals in a circumferential direction about the rotating axis.

The present invention will become clearer in light of the following detailed description of illustrative embodiments of this invention described in connection with the drawings.

DETAILED DESCRIPTION OF THE INVENTION

Figure 1:
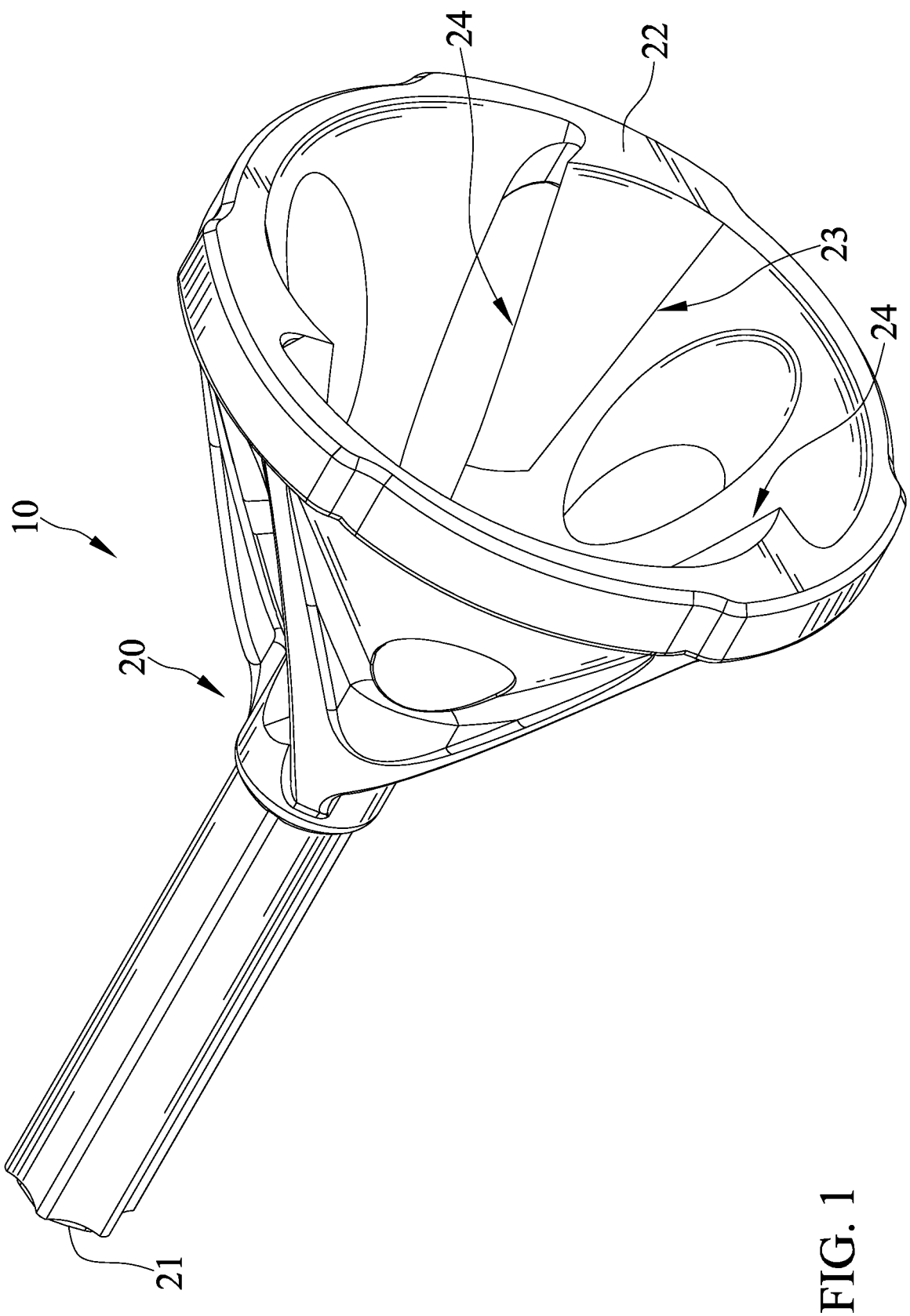
FIG. 1 is a perspective view of a rotary cutter for cutting damaged threads of a bolt of a first embodiment according to the present invention.
Figure 2:
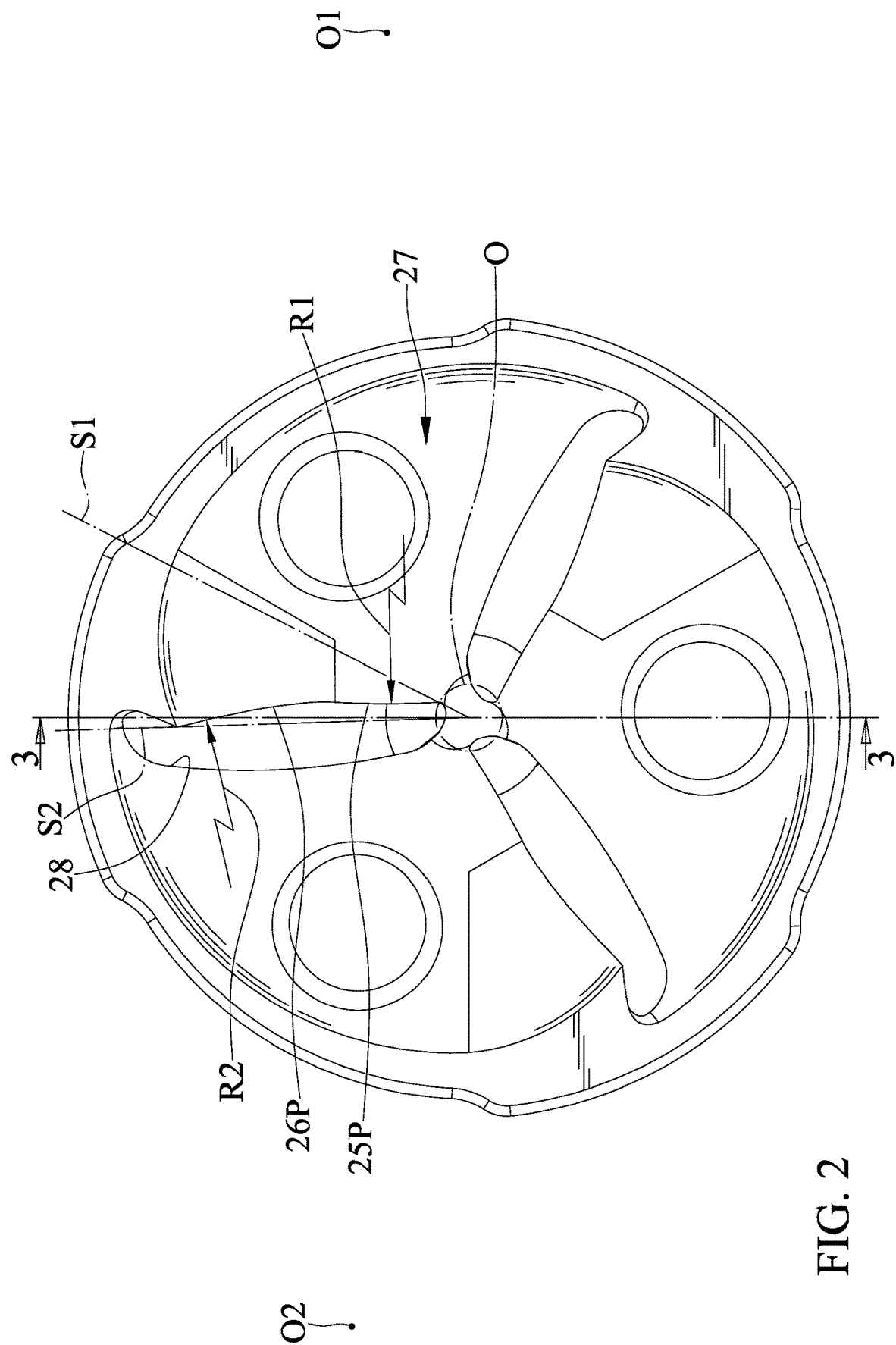
FIG. 2 is a side elevational view of the rotary cutter of FIG. 1.
Figure 3:
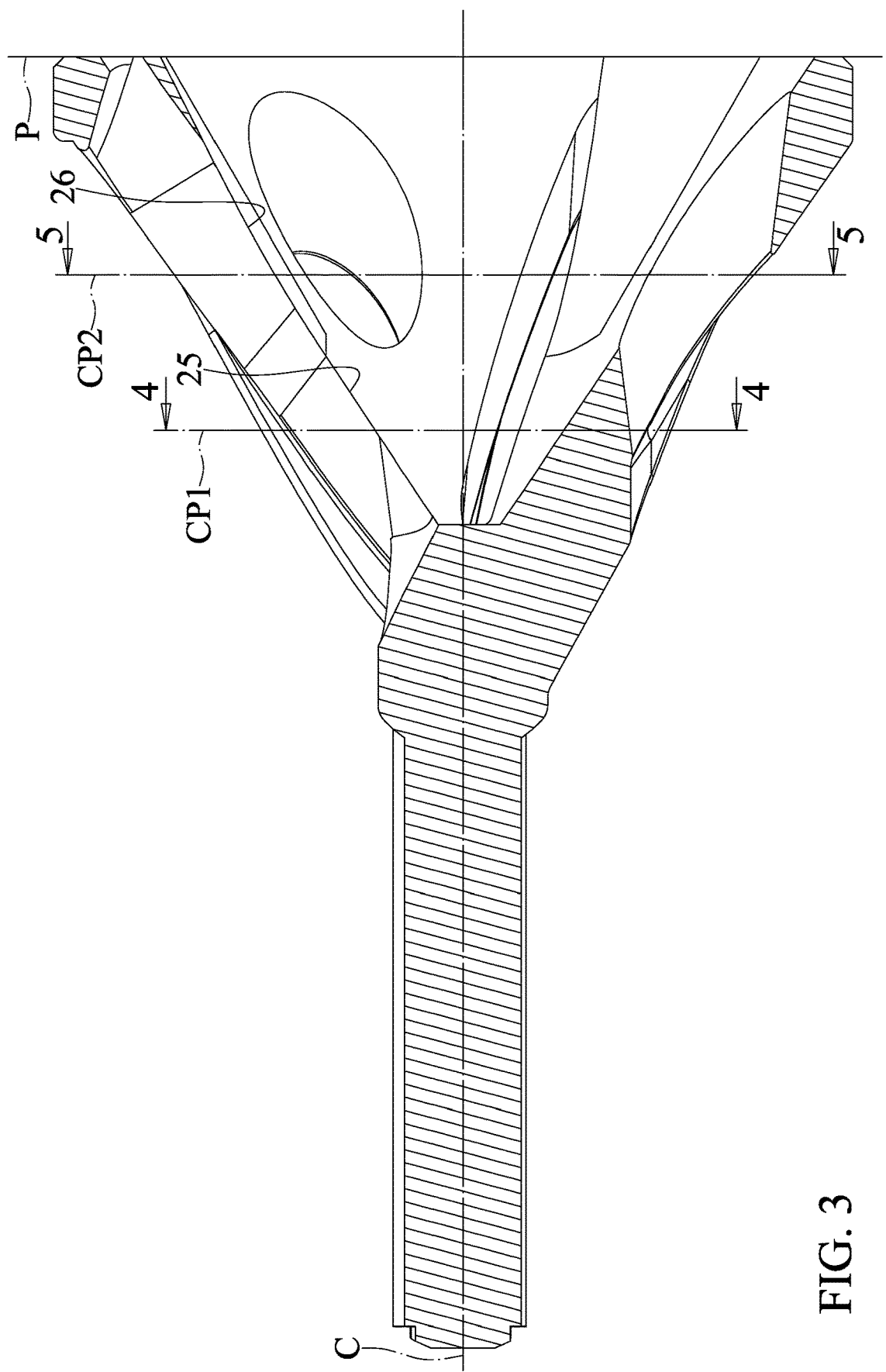
FIG. 3 is a cross sectional view taken along section line 3-3 of FIG. 2.
Figure 4:
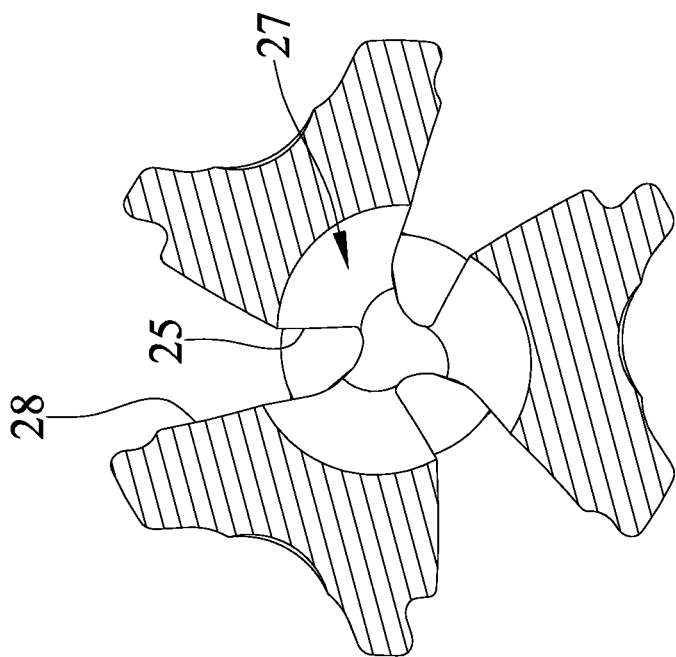
FIG. 4 is a cross sectional view taken along section line 4-4 of FIG. 3.
Figure 5:
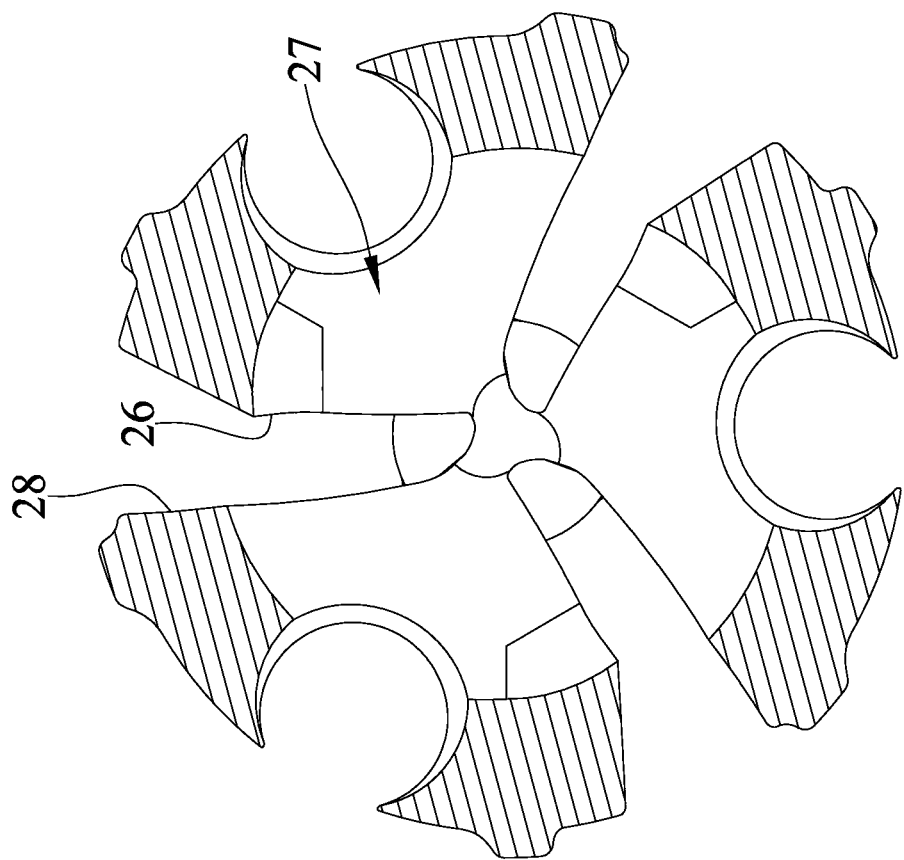
FIG. 5 is cross sectional view taken along section line 5-5 of FIG. 3.

With reference to FIGS. 1-5, a rotary cutter 10 for cutting damaged threads of a bolt of a first embodiment according to the present invention includes a body 20 rotatable about a rotating axis C. The body 20 includes a connecting end 21 and an operative end 22 opposite to the connecting end 21 along the rotating axis C. The connecting end 21 can be coupled to an electric tool or a pneumatic tool. The body 20 includes an inner periphery delimiting a cutting space 23 extending along the rotating axis C from the operative end 22 towards but spaced from the connecting end 21. A width of the cutting space 23 in a diametric direction perpendicular to the rotating axis C gradually reduces from the operative end 22 toward the connecting end 21 to form a conic space.

The body 20 further includes at least one cutting blade 24 disposed on the inner periphery thereof. The at least one cutting blade 24 includes a first cutting blade section 25 and a second cutting blade section 26. The first cutting blade section 25 is arcuate or rectilinear. The second cutting blade section 26 is arcuate or rectilinear. The first and second cutting blade sections 25 and 26 are not identical. The at least one cutting blade 24 is integrally formed with the body 20. The body 20 further includes a virtual projection plane P perpendicular to the rotating axis C. A first cutting blade section projection 25P is a projection of the first cutting blade section 25 on the virtual projection plane P. The first cutting blade section projection 25P includes a first center of circle O1 located on a side of the first cutting blade section projection 25P adjacent to a rear side of the first cutting blade section 25. The first cutting blade section projection 25P is an arcuate line and is concave towards the first center of circle O1. A first radius R1 is equal to a spacing between the first center of circle O1 and the first cutting blade section projection 25P and is in a range between 20 cm and 50 cm. In this embodiment, the first radius R1 is in a range between 25 mm and 35 mm.

A second cutting blade section projection 26P is a projection of the second cutting blade section 26 on the virtual projection plane P and is on a side of the first cutting blade section projection 25P opposite to the rotating axis C. The second cutting blade section projection 26P includes a second center of circle O2 located on a side of the second cutting blade section projection 26P adjacent to a front side of the second cutting blade section 26. The second cutting blade section projection 26P is an arcuate line and is concave towards the second center of circle O2. A second radius R2 is equal to a spacing between the second center of circle O2 and the second cutting blade section projection 26P and is in a range between 50 cm and 80 cm. In this embodiment, the second radius R2 is in a range between 60 mm and 70 mm. The second cutting blade section projection 26P is tangent to the first cutting blade section projection 25P in this embodiment.

The virtual projection plane P includes a virtual circle O, a first virtual reference line S1, and a second virtual reference line S2. The virtual circle O has a diameter between 1 mm and 20 mm. An end of the first cutting blade section projection 25P adjacent to the rotating axis C is located on the virtual circle O. The first virtual reference line S1 intersects with the rotating axis C and passes through the end of the first cutting blade section projection 25P. The second virtual reference line S2 intersects with the rotating axis C and passes through an end of the second cutting blade section projection 26P distant from the rotating axis C. An angle between the first virtual reference line S1 and the second virtual reference line S2 is between 20° and 40°. In this embodiment, the angle between first virtual reference line S1 and the second virtual reference line S2 is between 25° and 35°. A first virtual tangent plane CP1 extends perpendicularly to the rotating axis C and is tangent to the first cutting blade section 25. A spacing between the first cutting blade section 25 and the rotating axis C is smaller than a spacing between any point on the inner periphery of the body 20 delimiting the cutting space 23 and the rotating axis C (see FIG. 4). A second virtual tangent plane CP2 extends perpendicularly to the rotating axis C and is tangent to the second cutting blade section 26. A spacing between the second cutting blade section 26 and the rotating axis C is smaller than the spacing between any point on the inner periphery of the body 20 delimiting the cutting space 23 and the rotating axis C (see FIG. 5).

The inner periphery of the body 20 delimiting the cutting space 23 includes an evasive portion 27 and a scrap discharge groove 28 in a radial direction perpendicular to the rotating axis C. The evasive portion 27 and the scrap discharge groove 28 correspond to the at least one cutting blade 24. The evasive portion 27 is located on a rear side of the at least one cutting blade 24 and is contiguous to the at least one cutting blade 24. On the first virtual cutting plane CP1 or the second virtual cutting plane CP2, a spacing from the evasive portion 27 to the rotating axis C gradually increases from a side of the evasive portion 27 adjacent to the at least one cutting blade 24 towards another side of the evasive portion 27 distant from the at least one cutting blade 24. The scrap discharge groove 28 is located on a front side of the at least one cutting blade 24 and is contiguous to the at least one cutting blade 24. An end of the scrap discharge groove 28 intercommunicates with the cutting space 23. Another end of the scrap discharge groove 28 extends through the body 20 to an outer periphery of the body 20.

In this embodiment, the inner periphery of the body 10 includes three cutting blades 24 spaced from each other by regular angular intervals in a circumferential direction about the rotating axis C.

Figure 6:
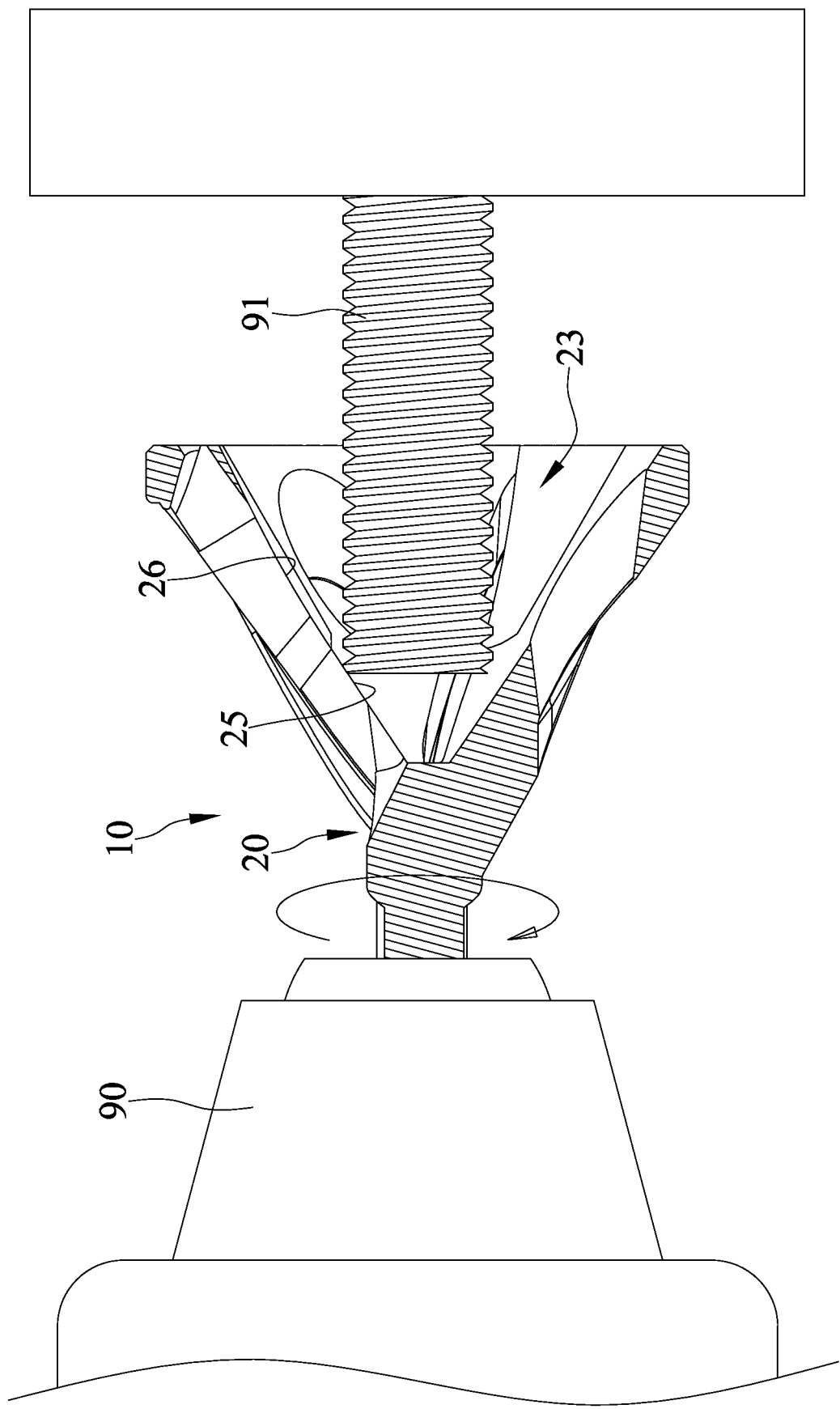
FIG. 6 is a diagrammatic cross sectional view of the rotary cutter of FIG. 1 used to cut a first bolt.
Figure 7:
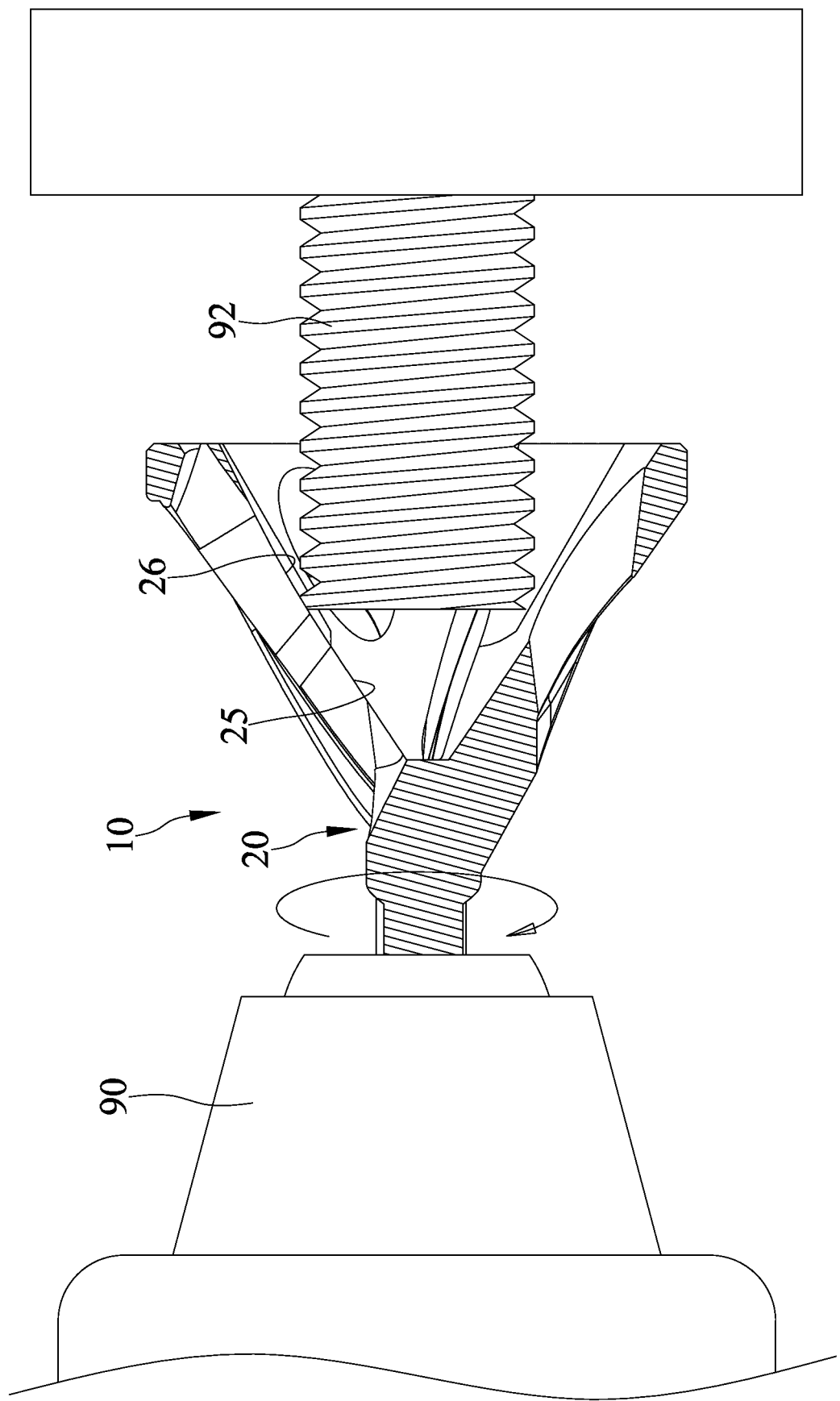
FIG. 7 is a diagrammatic cross sectional view of the rotary cutter of FIG. 1 used to cut a second bolt larger than the first bolt.

With reference to FIGS. 6 and 7, when in use of the rotary cutter of the first embodiment according to the present invention, the connecting end 21 is coupled to a driving tool 90, and the cutting space 23 holds a distal end of a first bolt 91 or a second bolt 92 having a diameter larger than a diameter of the first bolt 91. The driving tool 90 drives the rotary cutter 10 to rotate. The at least one cutting blade 24 shortens or cuts off a portion of the thread on the distal end of the first bolt 91 or the second bolt 92, such that a nut can be easily threaded onto the first bolt 91 or the second bolt 92.

In view of the above structure of the rotary cutter 10, since only the at least one cutting blade 24 contacts the first bolt 91 or the second bolt 92, the resistance resulting from friction is reduced to assure a smooth cutting process, and the scrap resulting from the cutting can be discharged through the scrap discharge groove 28. Furthermore, the rotary cutter 10 having the above multi-stage design has different cutting speeds for cutting the first and second bolts 91 and 92 having different diameters when the rotary cutter 10 has a constant rotating speed. Specifically, the rotary cutter cuts the first bolt 91 by the first cutting blade section 25 and cuts the second bolt 92 by the second cutting blade section 26. Through the arrangement of the rotary cutter 10 cutting the first bolt 91 or the second bolt 92 by the cutting blade sections of different angles, a proper cutting angle is provided no matter the rotary cutter 10 is cutting the first bolt 91 or the second bolt 92 while providing an excellent cutting effect.

Figure 8:
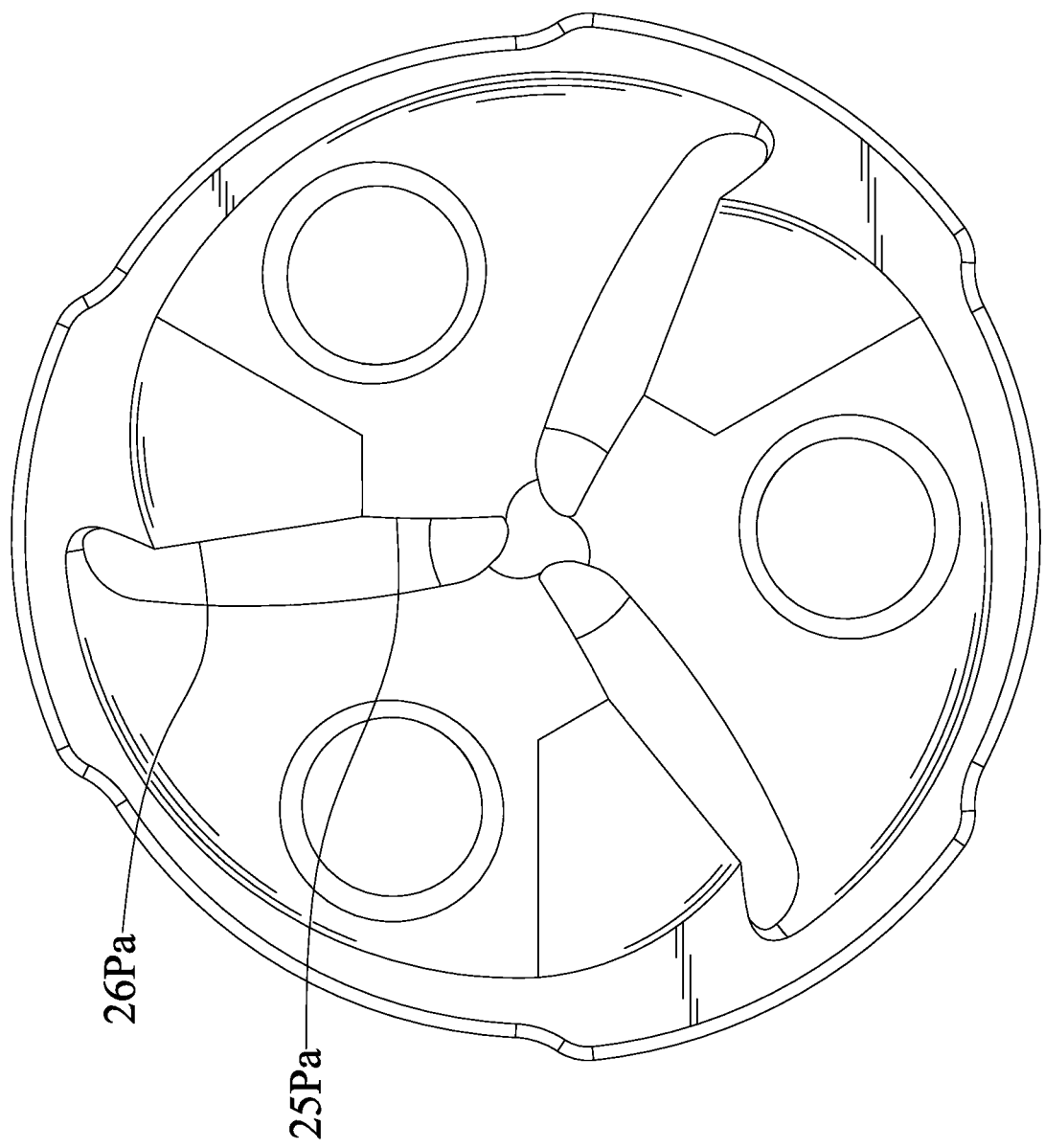
FIG. 8 is a side elevational view of a rotary cutter of a second embodiment according to the present invention.

FIG. 8 shows a rotary cutter of a second embodiment according to the present invention substantially the same as the first embodiment, except that the first cutting blade section projection 25Pa is arcuate, and the second cutting blade section projection 26Pa is rectilinear.

Figure 9:
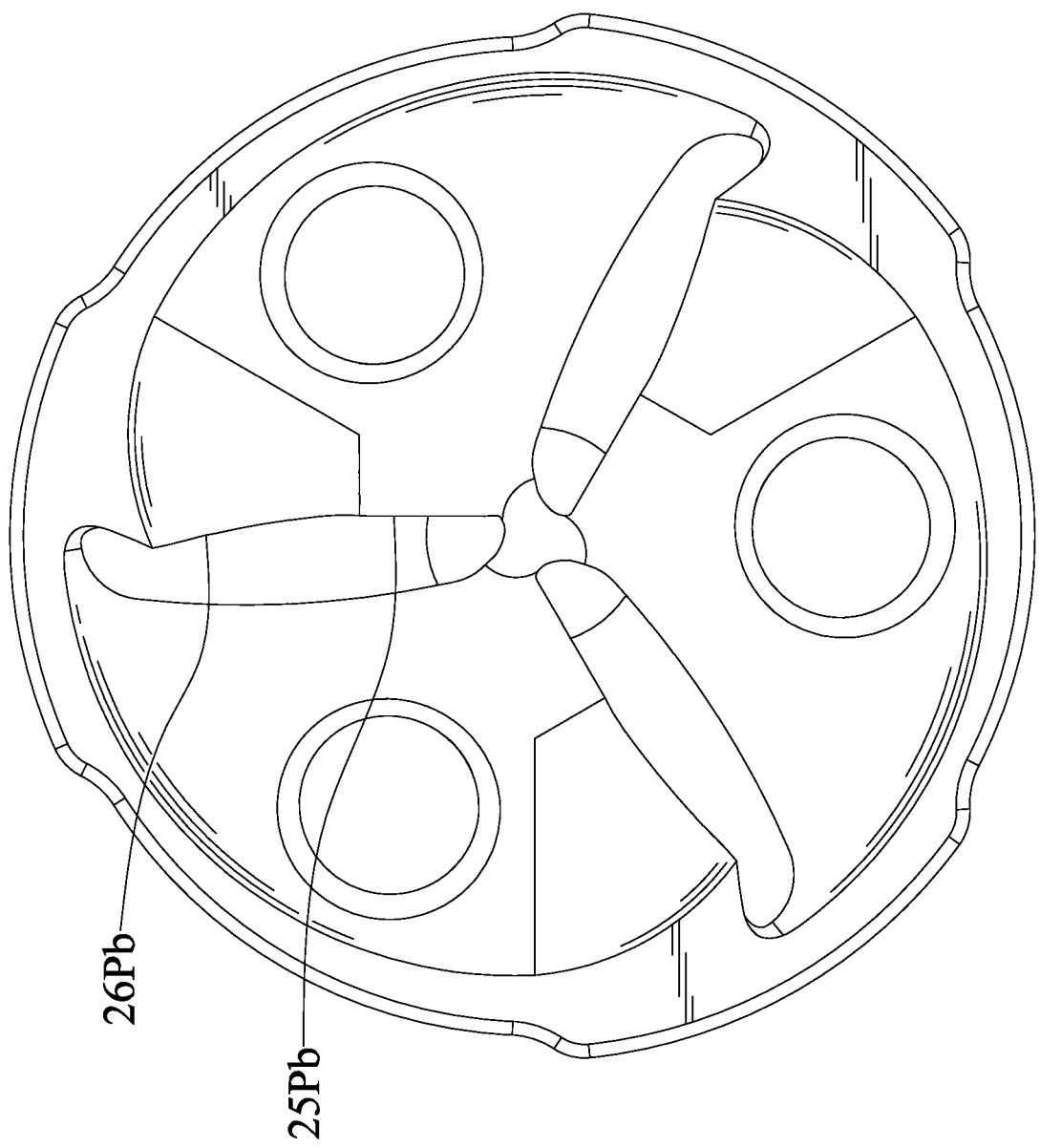
FIG. 9 is a side elevational view of a rotary cutter of a third embodiment according to the present invention.

FIG. 9 shows a rotary cutter of a third embodiment according to the present invention substantially the same as the first embodiment, except that the first cutting blade section projection 25Pb is rectilinear, and the second cutting blade section projection 26Pb is arcuate.

Figure 10:
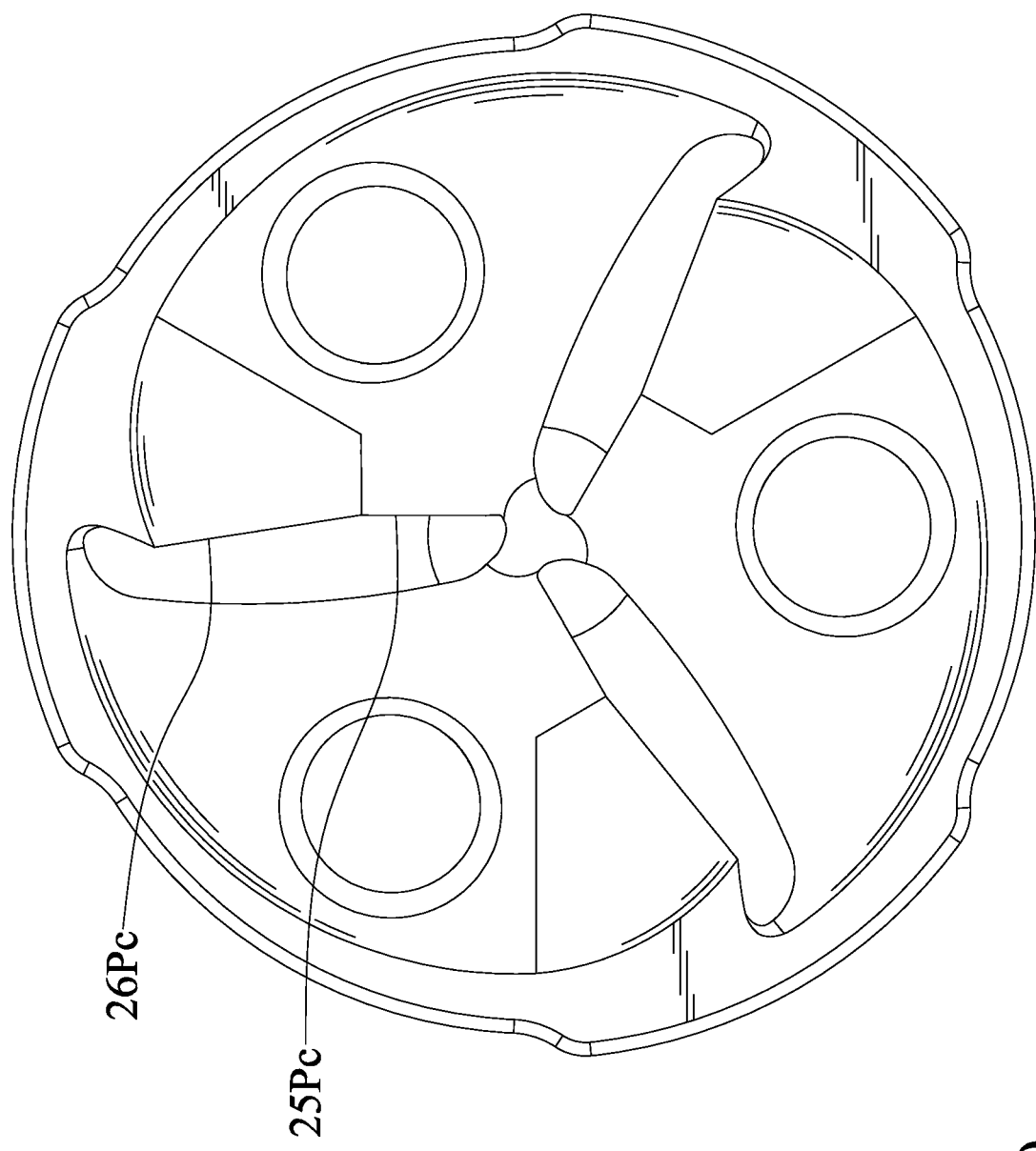
FIG. 10 is a side elevational view of a rotary cutter of a fourth embodiment according to the present invention.

FIG. 10 shows a rotary cutter of a fourth embodiment according to the present invention substantially the same as the first embodiment, except that the first cutting blade section projection 25Pc is rectilinear, and the second cutting blade section projection 26Pc is rectilinear.

Conclusively, the rotary cutter 10 according to the present invention can cut bolts of different diameters with a corresponding proper cutting angle, achieving an excellent cutting effect.

Although specific embodiments have been illustrated and described, numerous modifications and variations are still possible without departing from the scope of the invention. The scope of the invention is limited by the accompanying claims.

The invention claimed is:

1. A rotary cutter for cutting damaged threads of a bolt, comprising:

a body rotatable about a rotating axis, wherein the body includes a connecting end and an operative end opposite to the connecting end along the rotating axis, wherein the body includes an inner periphery delimiting a cutting space extending along the rotating axis from the operative end towards but spaced from the connecting end, wherein a width of the cutting space in a diametric direction perpendicular to the rotating axis gradually reduces from the operative end toward the connecting end to form a conic space, wherein the body further includes at least one cutting blade disposed on the inner periphery delimiting the cutting space, wherein the at least one cutting blade includes a first cutting blade section and a second cutting blade section, wherein the first cutting blade section is arcuate or rectilinear, wherein the second cutting blade section is arcuate or rectilinear, and wherein the first and second cutting blade sections are not identical, wherein a first virtual tangent plane extends perpendicularly to the rotating axis and is tangent to the first cutting blade section, wherein a spacing between the first cutting blade section and the rotating axis is smaller than a spacing between any point on the inner periphery of the body delimiting the cutting space and the rotating axis, wherein a second virtual tangent plane extends perpendicularly to the rotating axis and is tangent to the second cutting blade section, wherein a spacing between the second cutting blade section and the rotating axis is smaller than the spacing between any point on the inner periphery of the body delimiting the cutting space and the rotating axis.

2. The rotary cutter for cutting damaged threads of the bolt as claimed in claim 1, wherein the body further includes a virtual projection plane perpendicular to the rotating axis, wherein a first cutting blade section projection is a projection of the first cutting blade section on the virtual projection plane, wherein the first cutting blade section projection includes a first center of circle located on a side of the first cutting blade section projection adjacent to a rear side of the first cutting blade section, wherein the first cutting blade section projection is an arcuate line and is concave towards the first center of circle, wherein a first radius is equal to a spacing between the first center of circle and the first cutting blade section projection and is in a range between 20 cm and 50 cm, wherein a second cutting blade section projection is a projection of the second cutting blade section on the virtual projection plane, wherein the second cutting blade section projection includes a second center of circle located on a side of the second cutting blade section projection adjacent to a front side of the second cutting blade section, wherein the second cutting blade section projection is an arcuate line and is concave towards the second center of circle, and wherein a second radius is equal to a spacing between the second center of circle and the second cutting blade section projection and is in a range between 50 cm and 80 cm.

3. The rotary cutter for cutting damaged threads of the bolt as claimed in claim 2, wherein the first radius is in a range between 25 mm and 35 mm, and wherein the second radius is in a range between 60 mm and 70 mm.

4. The rotary cutter for cutting damaged threads of the bolt as claimed in claim 2, wherein the second cutting blade section projection is tangent to the first cutting blade section projection.

5. The rotary cutter for cutting damaged threads of the bolt as claimed in claim 1, wherein the body further includes a virtual projection plane perpendicular to the rotating axis, wherein a first cutting blade section projection is a projection of the first cutting blade section on the virtual projection plane, wherein a second cutting blade section projection is a projection of the second cutting blade section on the virtual projection plane, wherein the first cutting blade section projection is arcuate, and wherein the second cutting blade section projection is rectilinear.

6. The rotary cutter for cutting damaged threads of the bolt as claimed in claim 1, wherein the body further includes a virtual projection plane perpendicular to the rotating axis, wherein a first cutting blade section projection is a projection of the first cutting blade section on the virtual projection plane, wherein a second cutting blade section projection is a projection of the second cutting blade section on the virtual projection plane, wherein the first cutting blade section projection is rectilinear, and wherein the second cutting blade section projection is arcuate.

7. The rotary cutter for cutting damaged threads of the bolt as claimed in claim 1, wherein the body further includes a virtual projection plane perpendicular to the rotating axis, wherein a first cutting blade section projection is a projection of the first cutting blade section on the virtual projection plane, wherein a second cutting blade section projection is a projection of the second cutting blade section on the virtual projection plane, wherein the first cutting blade section projection is rectilinear, and wherein the second cutting blade section projection is rectilinear.

8. The rotary cutter for cutting damaged threads of the bolt as claimed in claim 1, wherein the body includes a virtual circle, a first virtual reference line, and a second virtual reference line, wherein the virtual circle has a diameter between 1 mm and 20 mm, wherein an end of the first cutting blade section projection adjacent to the rotating axis is located on the virtual circle, the first virtual reference line intersects with the rotating axis and passes through the end of the first cutting blade section projection, wherein the second virtual reference line intersects with the rotating axis and passes through an end of the second cutting blade section projection distant from the rotating axis, and wherein an angle between the first virtual reference line and the second virtual reference line is between 20° and 40°.

9. The rotary cutter for cutting damaged threads of the bolt as claimed in claim 8, wherein the angle between the first virtual reference line and the second virtual reference line is between 25° and 35°.

10. The rotary cutter for cutting damaged threads of the bolt as claimed in claim 1, wherein the inner periphery of the body delimiting the cutting space includes an evasive portion and a scrap discharge groove in a radial direction perpendicular to the rotating axis, wherein the evasive portion and the scrap discharge groove correspond to the at least one cutting blade, wherein the evasive portion is located on a rear side of the at least one cutting blade and is contiguous to the at least one cutting blade, wherein on the first virtual cutting plane or the second virtual cutting plane, a spacing from the evasive portion to the rotating axis gradually increases from a side of the evasive portion adjacent to the at least one cutting blade towards another side of the evasive portion distant from the at least one cutting blade, wherein the scrap discharge groove is located on a front side of the at least one cutting blade and is contiguous to the at least one cutting blade, wherein an end of the scrap discharge groove intercommunicates with the cutting space, and wherein another end of the scrap discharge groove extends through the body to an outer periphery of the body.

11. The rotary cutter for cutting damaged threads of the bolt as claimed in claim 1, wherein the at least one cutting blade is integrally formed with the body.

12. The rotary cutter for cutting damaged threads of the bolt as claimed in claim 1, wherein the at least one cutting blade includes three cutting blades spaced from each other by regular angular intervals in a circumferential direction about the rotating axis.

* * * * *